United States Patent Office 3,482,916
Patented Dec. 9, 1969

3,482,916
EXPOSURE CONTROL SYSTEM
Hansjuerg Mey, Oberengstringen, Zurich, Robert Wirth, Regensdorf, Zurich, and Reinhard Zeindler, Zurich, Switzerland, assignors to Ciba Limited, Basel, Switzerland
Filed Apr. 25, 1967, Ser. No. 633,553
Claims priority, application Switzerland, May 4, 1966, 6,455/66
Int. Cl. G03b 27/78, 27/52
U.S. Cl. 355—38                   18 Claims

ABSTRACT OF THE DISCLOSURE

An exposure control system in association with a photographic multi-colour printing apparatus to select and time the insertion of colour filters between a transparency and the exposed printing paper. Selection of the filters is through an exposure type unit associated with the particular type of exposure (additive, subtractive or mixed). The exposure type unit is controlled from an exposure time unit which provides timing signals for the insertion of the colour filters dependent on basic exposure parameters, the intensity of the light emergene from the transparency and, for subtractive exposure, the responses of the colour filters.

---

In its broadest aspect, the present invention provides an exposure control system for a photographic multi-colour printing apparatus, comprising an exposure time unit controllable, in dependence upon exposure parameters not related to the type of exposure, to provide signals each indicative of the exposure time of a particular colour filter; and an exposure type unit associated with a particular type of exposure and controllable by said signals to produce pulses for effecting selection of colour filters and the time for which they are selected.

The invention and the manner in which it is carried into effect may be better understood from the preferred embodiments thereof hereinafter described with reference to the accompanying drawings. However, the embodiments shown in the drawings are not intended to limit the scope of the invention as set forth in the appended claims. In the drawings:

FIG. 11c shows the characteristic curve of the diode (151) contained in the feedback loop of the logarithmic amplifier in FIG. 11a;

Figure 1:
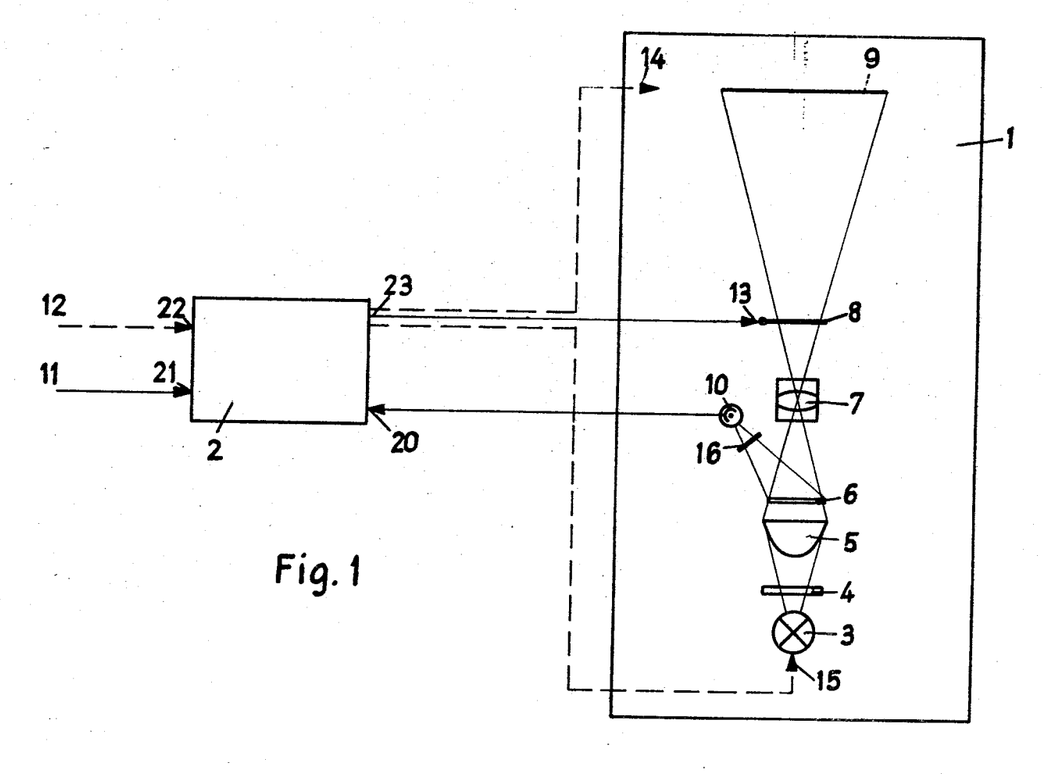
FIG. 1 is a diagrammatic representation of the layout of a printing apparatus provided with a control system according to the invention.

With reference to the general layout of the printing apparatus schematically shown in FIG. 1, the apparatus comprises a mechanical and optical part 1 and a control system generally indicated by reference numeral 2. The mechanical and optical part contains a lamp house 3 and an illuminating condenser 5. Between the lamp and the condenser fixed colour filters 4 may be interposed in the path of the light. The condenser illuminates the negative or positive transparency 6 which is imaged in the plane of the printing paper 9 by an objective 7. The colour of the exposure can be controlled by the selectable interposition in the light beam of printing filters 8. The set of printing filters is symbolically represented in the drawing by a single filter. Preferably an optical shutter is likewise provided. At an arbitrarily selectable point along the side of the beam one or more photosensistive elements 10 are provided. These respond to the intensity of the illuminating beam, possibly through interposed measuring filters 16. The photosensistive elements may be positioned either in front of or behind the objective. The purpose of the photosensistive elements is to measure the intensity of the light that passes through the negative or positive transparency and to transmit to the control means a signal containing information relating to the colour and density of the transparency. Finally a photosensistive element (not shown) may also be associated with the lamp 3 to permit the control means to compensate fluctuations in the intensity of the light emitted by the lamp.

Apart from the information supplied by the photosensitive elements 10 to an input 20 of the control unit further information is fed from the outside 11 into the control unit through an input 21. This information contains the "exposure parameters" and comprises all the data which, apart from monitoring signals supplied by the photosensitive elements, have a bearing upon the exposure time. A further input 22 is provided for the application thereto from 12 of a starting pulse intended to initiate the entire process of making an exposure. The control unit 2 has an output 23 which energises magnets (possibly servo motors) 13 for moving the printing filters 8 into and out óf the light beam and for operating the shutter. The lines and arrows 14 and 15 symbolise means which may be provided for controlling the paper feed 14 and the brightness of the lamp 15. However, these form no part of the present invention.

The invention substantially concerns only the control unit 2. The mechanical and optical part 1 of the printing apparatus is deemed to be given or of a known kind. The invention concerns the logic circuitry between the inputs 20 and 21 of the control unit and its output 23. (In FIG. 1 the inputs and outputs of the control unit 2 are merely symbolic representations and it must be understood that in reality these "inputs" and "outputs" may comprise a plurality of incoming and outgoing connections. The input and output lines in FIG. 1 are merely illustrative of the totality of the respective input and output connections).

In the following description the term "pulse" is understood to mean any voltage or current which can have two possible states, and which therefore has a binary character. In contradistinction thereto the term "signal" will be used to describe quantities which may vary within a continuous range of magnitudes.

Figure 2:
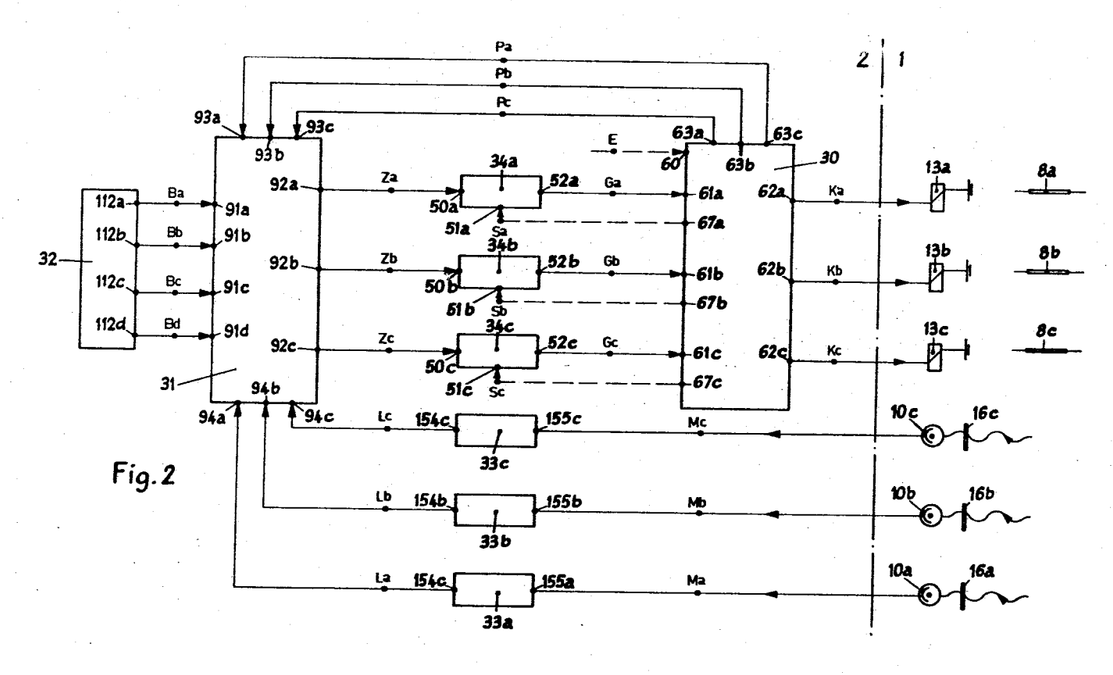
FIG. 2 is a block diagram of the exposure control system represented in FIG. 1.

The block diagram of the proposed control unit shown in FIG. 2 includes only those components of the mechanical and optical part 1 of the apparatus which are directly connected to the control unit 2 and which are directly relevant to an understanding of the manner in which the system works. According to the invention the control unit 2 substantially comprises an exposure type unit 30, an exposure time unit 31, an input unit for supplying the exposure parameters 32, three logarithmic amplifiers 33 and three exponential timing units 34. These components will be later described in greater detail. First the manner in which the system generally functions will be explained by reference to the diagram in FIG. 2.

The arrangement according to FIG. 2 is designed to control the positions of three printing filters 8a, 8b and 8c by means of three actuating magnets 13a, 13b and 13c. These magnets 13a, 13b and 13c are energised by filter control pulses Ka, Kb and Kc supplied by an exposure type unit 30. This unit receives primary colour input pulses Ga, Gb and Gc and a trigger pulse E. The primary colour pulses Ga, Gb and Gc contain the information relating to the length of the required exposure with each primary colour, say blue, green and red. The exposure type unit processes these primary colour pulses according to the set of filters employed and produces corresponding filter control pulses. For instance, the excitation of the filter actuating magnets 13a, 13b and 13c will depend upon whether the colours of the printing filters 8a, 8b and 8c are additive or subtractive colours and so forth. The primary colour pulses Ga, Gb and Gc are themselves generated by exponential timing units 34a, 34b and 34c whose inputs 50a, 50b and 50c receive time control signals Za, Zb and Zc from the exposure time unit 31. These time control signals are converted by the exponential timing units 34a, 34b and 34c into primary colour pulses Ga, Gb and Gc. The beginning of each primary colour control pulse is defined by the reception of a trigger pulse Sa, Sb and Sc likewise generated in the exposure type unit 30 under the control of a starting pulse E which is injected from the outside. The output signals 21, i.e. the time control signals Za, Zb and Zc of the exposure time unit 31 are generated under the control of input signals derived from three sources. Firstly, the exposure parameter input unit 32 provides the exposure parameter signals Ba, Bb, Bc and Bd, secondly logarithmic monitoring signals La, Lb and Lc are supplied by the light-sensitive elements 10a, 10b and 10c through logarithmic amplifiers 33a, 33b and 33c and finally the exposure type unit 30 provides parasitic absorption correcting signals Pa, Pb and Pc. The exposure parameter input unit 32 processes all those data which are injected in addition to the monitoring signals into the system from the outside in the form of exposure parameter signals Ba, Bb, Bc and Bd.

The logic of the described control system resides in the general principle underlying the lay-out according to FIG. 2 and in the more detailed construction of the exposure type unit 30, the exposure time unit 31 and the exposure parameter input unit 32. It is an important feature of the system that the two last named units 31 and 32 which generate signals within the above defined meaning of the term are separated from the mechanical-optical part 1 of the printing aparatus by the logarithmic amplifiers 33a, 33b, 33c and the exponential timing units 34a, 34b and 34c. This means that the variety of monitored quantities and exposure times is processed in the control system after these have been logarithmically "compressed." With reference to the negative or positive transparency and the image on the paper this implies that the said signals are related to the densities and to the transmittances. The introduction of the logarithms affords considerable advantages, namely:

The extremely wide range of transmittances of the negative or positive transparencies can be allowed for without switching operations being required in the apparatus, the relative accuracy remaining completely constant.

Like signal increments roughly represent like subjective increments (Weber Fechner Law).

The signal logarithms can be linearly processed (by addition, subtraction, multiplication with constant factors).

The construction of the principal units will now be described in greater detail:

Exposure type unit

Figure 3:
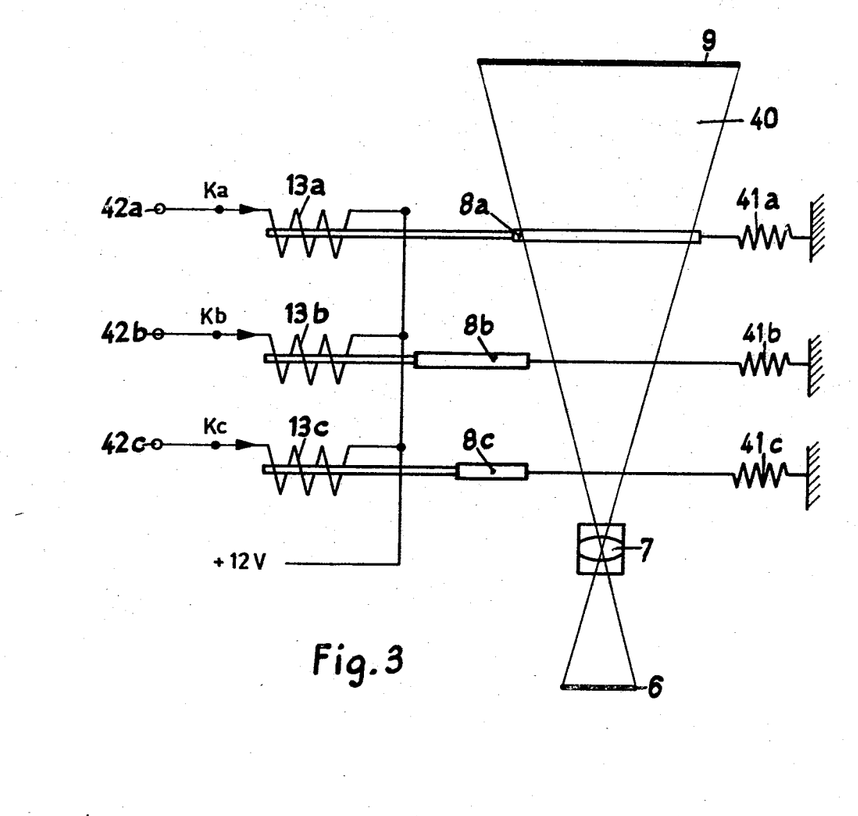
FIG. 3 illustrates the manner in which colour filters in the printing apparatus are actuated.

First and foremost it may be convenient to define the filter control pulses Ka, Kb and Kc by reference to FIG. 3. One pole of each of the three filter actuating magnets or solenoids 13a, 13b and 13c is connected to a 12 volts potential source. the other poles 42a, 42b and 42c are connected to the exposure type unit 30. The printing filters are mechanically connected to the magnets in such manner that the filters will be interposed in the path of the light beam 40 when the magnets are not energised. This position of the filters is maintained by springs 41a, 41b and 41c. In the illustrated position only one filter 8a is interposed in the light beam 40. This is because its associated magnet 13a is the only magnet that is not excited, a potential of 12 volts having been applied to its input 42a whereas the potential at the corresponding inputs 42b and 42c of the two other magnets is 0 volts. Consequently the two magnets 13b and 13c are excited by the full voltage of 12 volts of the potential source. The two filters 8b and 8c are therefore withdrawn from the beam.

Figure 4A:
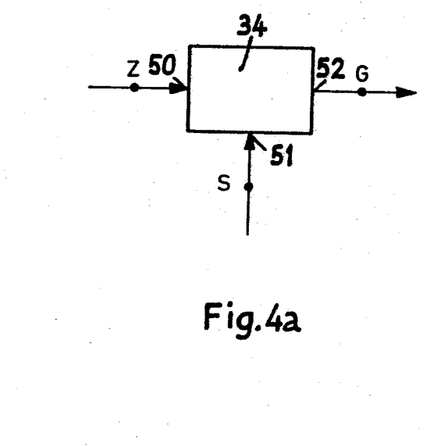
FIGS. 4a to 4c illustrate an exponential timing unit, the circuit thereof being shown in FIG. 4a, and FIGS. 4b and 4c showing the form of the input and output signals.
Figure 4B:
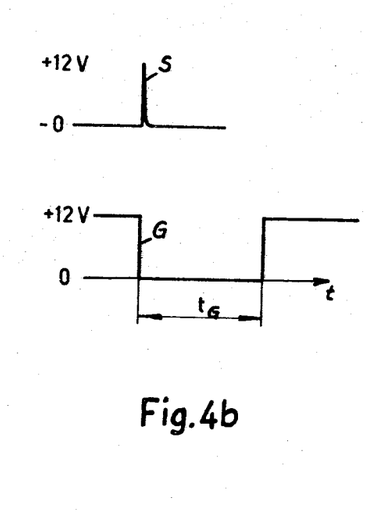
Figure 4C:
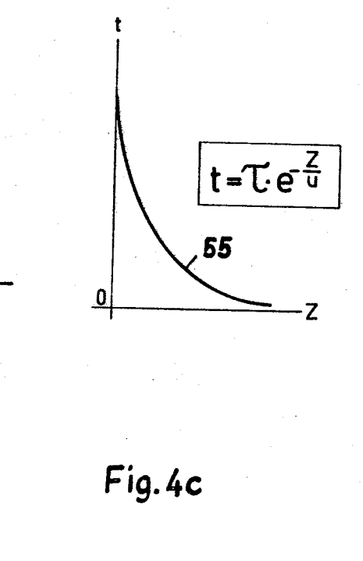

FIGS. 4a to 4c illustrate the input pulses Ga, Gb and Gc of the exposure type unit 30. FIG. 4a represents one of the exponential timing units 34a to 34c shown in FIG. 2, the timing unit itself being here marked 34, its two inputs 50 and 51 and its output 52. FIG. 4b is a voltage versus time curve, the upper diagram being the trigger pulse S which is applied to input 51 (FIG. 4a), whereas the lower diagram represents the corresponding colour control pulse G which appears in the output 52 of the timing unit (FIG. 4a). The duration $t_G$ of the colour control pulse, as shown in FIG. 4c, is controlled by a timing signal Z appearing at the input 50 (FIG. 4a) according to an exponential relationship. The curve 55 in FIG. 4c represents this exponential relationship. The negative sign of the exponent implies that the duration $t_G$ of the colour control pulse G decreases when the input signal at 50 rises. According to the definition given in FIG. 4b rest potentials of +12 volts are applied to the inputs (FIG. 2: 61a, 61b, 61c) of the exposure type unit 30, whereas zero potentials are applied for the duration $t_G$ of the colour control pulse. The importance of the parasitic absorption correcting signals Pa, Pb and Pc will be later described with reference to FIG. 6. The exposure type unit 30 thus performs three functions namely: Firstly it generates the control pulses for the printing filters K, secondly it generates the trigger pulses S for the three exponential timing units 34 and thirdly it generates the three parasitic absorption correction signals P for application to the exposure time unit 31. These three functions are differently performed according to whether the colour printing process is additive, subtractive or a mixed process. This will now be explained in the two following examples.

Figure 5:
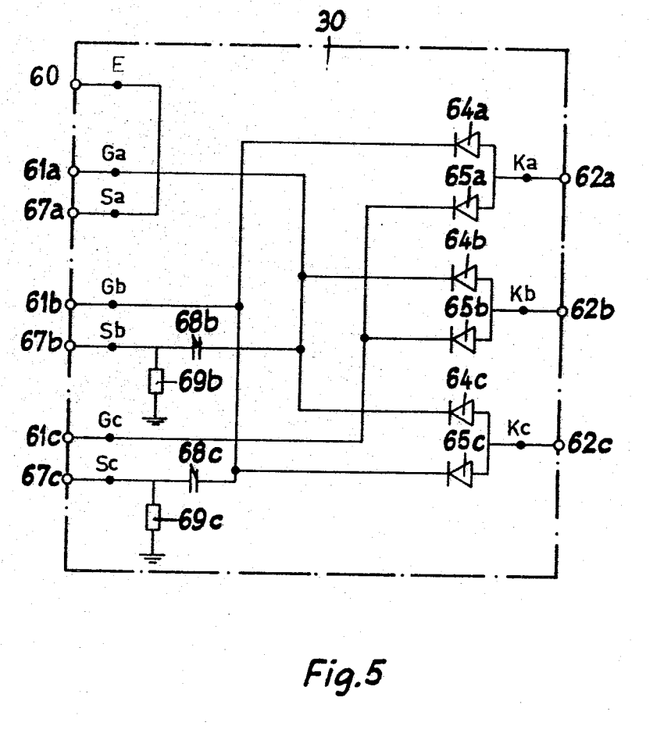
FIG. 5 shows the circuit of an exposure-type unit for additive printing.
Figure 5A:
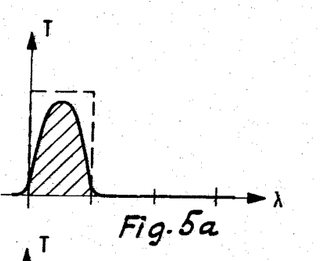
FIGS. 5a to 5c are the filter transmittance curves of a set of additive filters.
Figure 5B:
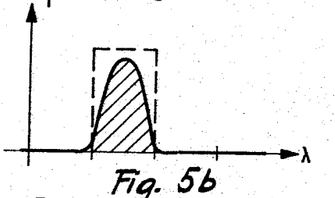
Figure 5C:
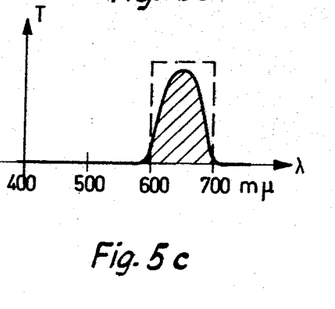

FIG. 5 is an embodiment of an exposure type unit for additive exposures. FIG. 5a to 5c are schematic representations of the corresponding filter transmittance Tλ plotted as a function of the wave length λ. The three filters blue (FIG. 5a), green (FIG. 5b) and red (FIG. 5c) each transmit roughly one third of the visible spectrum. Ideal filter curves would be the rectangular chain line curves, whereas the curves that are in practice attainable are shown in full lines. The question how these filters differ when negative or positive transparencies are to be processed need not here be discussed, since these differences do not affect the logic of the proposed control system.

In the circuit lay-out of the exposure type unit 30 for additive printing the inputs 61a to 61c are connected to the three outputs 62a to 62c through six diodes so arranged that whenever one of the three inputs 61a to 61c is at zero voltage the filter actuating magnets associated with the two other outputs will be energised to keep the corresponding filters withdrawn from the light beam (cf. FIG. 3). For instance, assuming that the momentary exposure happens to be with blue light, then the potential at 61a will be zero whereas zero potentials at 62b and 62c will cause the green and red filters to be withdrawn. In other words, only the blue filter will remain in the beam and the desired exposure with blue light can thus be effected. The system functions in a corresponding manner for exposures through the green and red filters. The trigger pulse of 12 volts (as illustrated in FIG. 4b) appearing at the input 60 starts the blue light exposure via 67a and the exponential timing unit 34a (FIG. 2). The differentiating network 68b and 69b transmits a positive trigger pulse to 67b, i.e. to the trigger input of the exponential timing unit 34b when the potential of Ga jumps from zero to +12 volts, i.e. when the exposure with blue light has been completed. In the same way the potential Gb triggers the exponential timing units 34c via the differentiating network 68c, 69c connected to terminal 67c. The three colour exposures are thus automatically controlled to take place sequentially. In the case of additive exposures no parasitic correcting signals arise and in this case the signals Pa, Pb and Pc (FIG. 2) are not therefore used.

Figure 6:
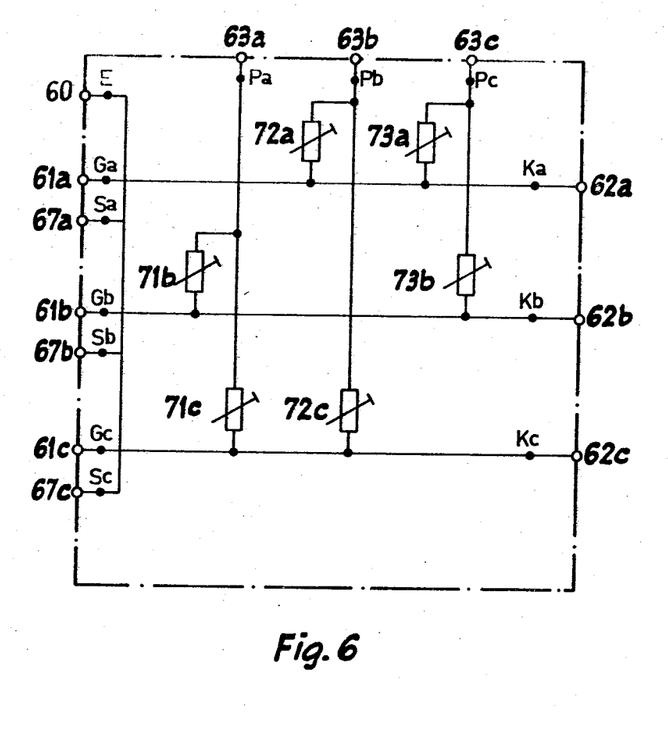
FIG. 6 shows the circuit diagram of an exposure type unit for subtractive printing.
Figure 6A:
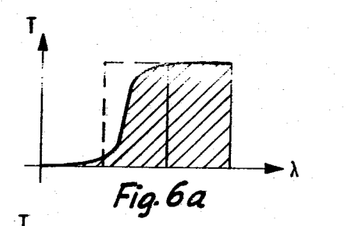
FIGS. 6a to 6c are the filter transmittance curves of a set of subtractive filters.
Figure 6B:
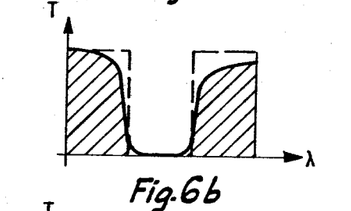

FIG. 6 is an embodiment of an exposure type unit for subtractive exposures. FIGS. 6a to 6c are again the transmittance curves $T\lambda$ of the colour filters plotted with the wave length $\lambda$ as the base. Ideal transmittance curves would be as indicated by chain lines, whereas the practically attainable curbes are shown in full lines. FIG. 6 reveals that the substractive exposure type unit control of the filter actuating magnets via the outputs 62a to 62c is quite simple since, in this method of working, the filter control pulses Ka, Kb and Kc are identical with the colour control pulses Ga, Gb and Gc. In a subtractive-exposure all the exposures are controlled to begin simultaneously by the general starting pulse E which is applied through input 60 in parallel to the several trigger pulse inputs of the exponential timing units via the terminals 67a and 67c (FIG. 2). The appearance of the trigger pulse E therefore causes all three colour filters to be withdrawn from the beam until the shortest exposure time ends and the corresponding complementary colour filter is interposed in the beam at the end of the exposure.

The proposed exposure control also permits the parasitic absorption of the filters in subtractive exposures to be corrected. This will now be explained in greater detail on the assumption that the red exposure is the first to be completed (up to this instant all three primary colours blue, green and red are exposed at full intensity).

Figure 6C:
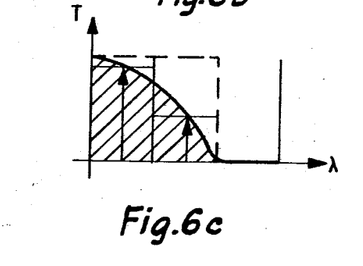

It will be understood from FIG. 6c that upon interposition of the cyan blue filter the intensity of the blue light is only slightly, but that of the green light considerably attenuated. This is due to the fact that the filters may quite considerably deviate from an ideal transmittance curve and sometimes exhibit pronounced parasitic absorption. If the light sensitive elements 10 (FIG. 1) are positioned behind the exposure filters, the blue and green sensitive elements 10 will in the above assumed circumstances receive less light and transmit a less powerful signal to the control system and thus correct the exposure time automatically, subject to secondary effects.

Quite apart from the fact that some of these secondary effects may be fairly significant it is in principle far better to dispose the photosensitive elements—as is shown in FIG. 1—in front of the filters. The proposed control system permits this to be done. If the timing signals Za, Zb and Zc are corrected in the right direction after the interposition of the cyan blue filter, the corresponding exposure times can be prolonged without the intensity of the light incident on the photosensitive elements being changed. To this end correcting signals for parasitic absorption Pa to Pc (FIG. 6) are derived in the following way:

When a filter is in the light beam this means that its associated magnet is not energised, i.e. that its filter control pulse is at the potential of +12 volts (cf. FIG. 3). In the above descibed example in which the cyan blue filter is in the beam, the line 61c–62c is therefore at +12 volts and the corresponding lines 61b–62b and 61a–62a are at zero potential. An adjustable potentiometer 71c connects the +12 volt source via output 63a and the line for the parasitic absorption correction signal Pa to the exposure time unit 31 which in turn delivers a corrected time control signal Za to the exponential timing unit 34a. Similarly the input signal applied to the exponential timing unit 34b is modified by a signal via potentiometer 72c and the terminal 63b. As already mentioned, these corrections operate to prolong the respective exposure times in accordance with the correcting signals for parasitic absorption beyond the exposure times that would apply in the absence of these signals. The six potentiometers 71b, 71c, 72a, 72c, 73a and 73b correspond to the six possible parasitical absorptions of the subtractive printing filters according to FIGS. 6a to 6c. A particular set of three subtractive printing filters therefore requires a particular exposure type unit in which the potentiometers for the generation of the correcting signals for parasitic absorption are adjusted according to the characteristics of the set of filters.

Analogously to the examples illustrated in FIGS. 5 and 6 every possible type of exposure can be realised with the aid of the exposure type unit and corresponding sets of filters. In some methods the exposure begins with white light, whereupon the remaining colour exposures are additive. Other methods make use of an additive exposure with the blue light and of a subtractive exposure in the green and red spectral regions. The performance of all these methods affects only the circuitry of the exposure type unit 30 but no other part of the control system.

Exposure time unit

Figures 7A, 7B:
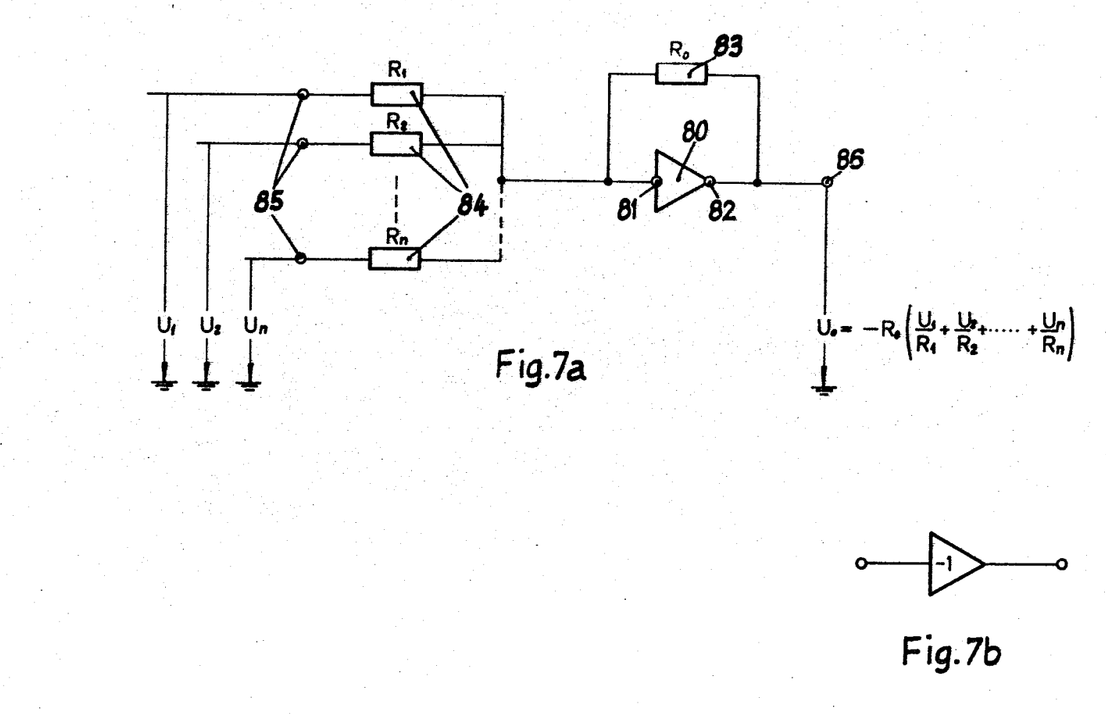
FIG. 7a illustrates an operational amplifier for adding electrincal input signals, as used more particularly in the exposure time unit.
FIG. 7b shows the symbol for an inverting amplifier.

The exposure time unit 31 merely combines input signals to form fresh signals. The basic unit for carrying out such combination is a summation amplifier. FIG. 7a illustrates the principal parts of the summation amplifier for a better understanding of the following explanations. As shown in this drawing a very high gain amplifier 80 producing a 180° phase shift is provided with negative feedback through a resistor 83. Input voltages U1, U2 to U$n$ are applied to the input terminals 85 and through resistors 84 (R1, R2 to R$n$) to the input terminal 81 of the amplifier. A voltage can thus be obtained from the output 86 of the amplifier which corresponds to the sum of the individual input voltages weighted by the input resistances 84. However, the summation voltage will have a negative sign. The summation amplifier is therefore suitable for adding electrical signals after these have been provided with a selectable factor. If only one input resistor 84 is provided and this has the same resistance as the feedback resistor 83, then the absolute values of the input and output voltage will be the same and merely the sign will change. This arrangement therefore constitutes an inverting amplifier symbolised as indicated in FIG. 7b.

Figure 8:
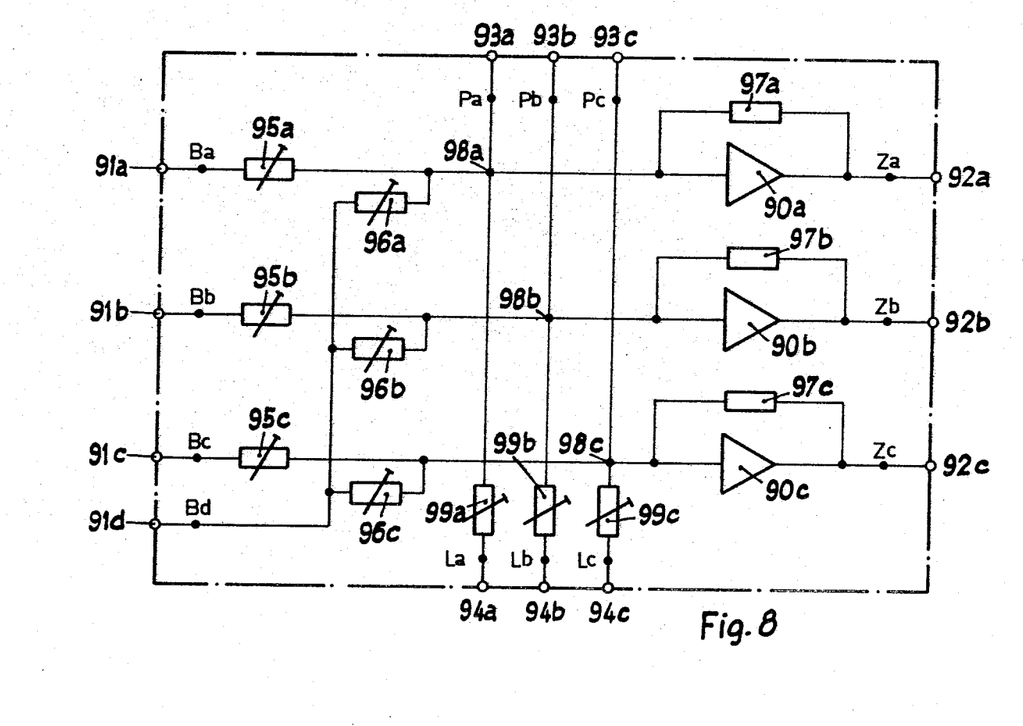
FIG. 8 shows the circuit diagram of a preferred embodiment of an exposure time unit.

The circuitry of the exposure time unit 31 as exemplified in FIG. 8 is based upon the use of summation amplifiers of the above described type. In conformity with the three time control signals Za, Zb and Zc which can be obtained from the three terminals 92a to 92c three summation amplifiers 90a, 90b and 90c are provided. The summation amplifier 90a adds signals applied to the three terminals 91a, 91d and 94a modified by the variable resistors 95a, 96a and 99a. Hence the blue exposure time which is determined by the signal appearing at the terminal 92a is a function of the three superimposed signals Ba, Pa and La. Ba is the signal delivered by the exposure parameter input unit 32 for the blue exposure, i.e. that associated with the yellow colour component of the colour print on the paper. La is the logarithmic monitoring signal provided by the corresponding photosensitive element, i.e. by that element which is provided for the reception of the blue light. A fourth signal Bd is applied to the terminal 91d. This is likewise supplied by the exposure parameter input unit. It is not tied to a particular colour but merely represents the luminance of the image. Consequently the signal Bd affects all three summation amplifiers 90a to 90c through variable resistors 96a, 96b and 96c and hence all three time control signals Za, Zb and Zc. By suitably adjusting the three resistors 96a, 96b and 96c time control signals Za to Zc can thus be obtained in such a way that no colour changes occur in the print when the signal Bd varies. Provided the potentiometers 96a to 96c have been appropriately adjusted the signal Bd will have no effect upon colour. The settings of the potentiometers 95a, 95b and 95c affect the magnitude of the colour changes caused by given changes in the exposure parameter signals Ba, Bb and Bc at the inputs 91a, 91b and 91c. The potentiometers 99a, 99b and 99c which feed in the logarithmic monitoring signals may in principle be so adjusted that the colour change measured by each of the photosensitive elements 10a, 10b and 10c (FIG. 2) is completely corrected. From the theory of "grey scale equivalence" it is known that this is the case when in each primary colour the product of colour transmittance (of the negative or positive transparency) times colour exposure time is a given constant. For achieving optimal printing results it is nevertheless advisable not to effect a complete correction but intentionally slightly to undercorrect or overcorrect in the three colours to different extents. These effects are known in the technology of printing apparatus as "slope control." The present invention permits allowance to be made for slope control by the very simple operation of adjusting the resistances of the three potentiometers 99a, 99b and 99c.

The parasitic absorption correcting signal Pa which has been described by reference to FIGS. 6 and 6a to 6c is fed into the exposure time unit via the input terminal 93a as a positive voltage. Consequently the effect of the signal Pa will be to lower the signal Za appearing at the output terminal 92a because of the inverting action of the summation amplifier 90a. According to the definition of the exponential timing unit 34 in FIG. 4a (4b, 4c) a falling signal Z means that the exposure time $t_G$ will be longer. This is exactly the effect the introduction of the correcting signal for parasitic absorption is intended to produce.

Figure 9A:
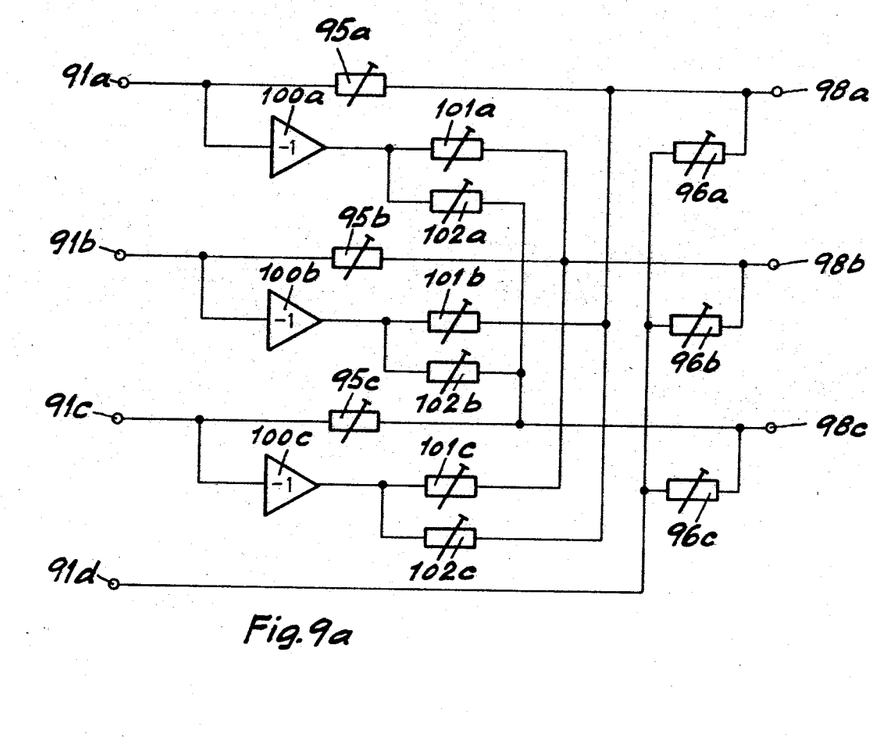
FIGS. 9a and 9b show circuit modifications of details of the exposure time unit shown in FIG. 8.
Figure 9B:
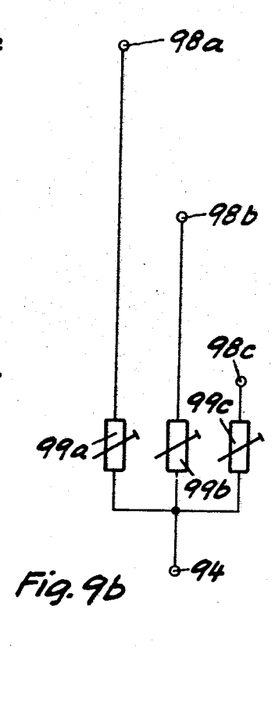

FIGS. 9a and 9b show modifications of the exposure time unit according to FIG. 8. For the sake of simplicity the summation amplifiers 90a to 90c (FIG. 8) have been omitted and only the essential components at the input nodes 98a, 98b and 98c are shown. FIG. 9a illustrates how the exposure parameter signals Ba, Bb, Bc which arrive via lines 91a, 91b, 91c can also be taken to other channels through inverting amplifiers 100a to 100c. If the values of the potentiometers 101a to 101c and 102a to 102c are suitably chosen and the potentiometers appropriately set the luminance of the image can be prevented from being affected by any change in the exposure parameter signals.

FIG. 9b shows a modification of FIG. 8 containing only one input 94 for a logarithmic measuring signal and therefore associated with only one logarithmic amplifier 33 and only one photosensitive element 10 (cf. FIGS. 1 and 2). This photosensitive element 10 may be sensitive to the entire spectral range and nevertheless modify all three colour exposure times via the three resistors 99a to 99c. This means that only the luminance of the image is subject to automatic compensation but not its colour. Other combinations can be devised for circuit embodiments of the exposure time unit 31, such as the use of two instead of three photosensitive elements or the combination of three elements with a unit in which the exposure parameter signals are processed in the manner illustrated in FIG. 9a. Such methods permit filters to be calculated or simulated which are in fact not provided, or which are not in practice available.

Exposure parameter input unit

Apart from the monitoring signals three categories of data are of importance for determining the exposure times required for the individual colour images, namely: Firstly the basic settings. These relate to the speeds of the emulsions on the paper, to the definition of the "standard" reproduction and to the invariant properties of the printing apparatus. Secondly the properties of the type of film. Different makes of negative or positive transparency film material (possibly even different emulsions of the same make) may have substantially different properties from the point of view of printing. These remain constant for each particular make (or at least for the same emulsion). Thirdly, corrective data: These are parameters which change from picture to picture and which call for specific adjustment of the printing times based on subjective judgments.

It is desirable that these three categories of exposure parameters should be capable of being separately and independently fed into the apparatus. For instance the basic and the correcting settings should remain unaffected when the make of film is changed. Furthermore, it should be possible to transfer parameters from one into another category without quantitative change. For example, if it is decided that each picture requires a red correction it may be desirable after a time to transfer this red correction into the basic settings or into the adjustment for film type. Naturally this means that the quantitative magnitude of such a parameter must be accurately known. The proposed control system and the parameter input unit permit all these requirements to be fulfilled. This will now be described in greater detail.

Figure 10:
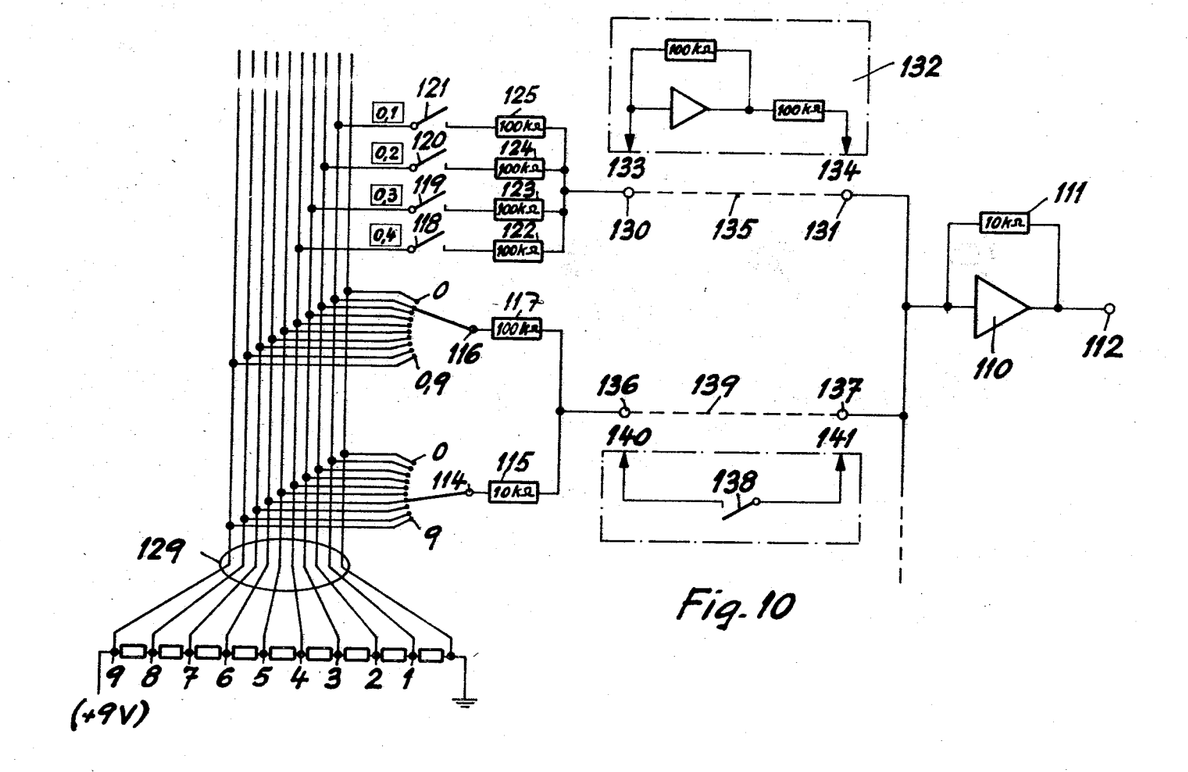
FIG. 10 shows the circuit diagram of a preferred embodiment of an input unit for exposure parameters.

FIG. 10 illustrates the principle underlying the circuit arrangements in the exposure parameter input unit 32. Ten fixed potentials 113 between say 0 to 9 volts can be tapped from a potential divider 113. These potentials are made available through a ten-conductor cable 129 to a plurality of switches and keys including a ten-position switch adapted to apply any one of the voltages 0 to 9 volts through a resistor 115 and a wire 130 to a summation amplifier 110 provided with a feedback resistor 111. The potential steps appearing in the output 112 of the summation amplifier are unchanged because the values of the two resistors 115 and 111 are identical (in the illustrated embodiment 10 kilo-ohms), but the polarity of the voltages will be reversed because of the inverting properties of the summation amplifier. A further switch 116 is likewise adapted to tap ten potentials from 0 to 9 volts, but this switch delivers the tapped potentials to the summation amplifier 110 through a resistor 117 which is ten times the value of resistor 115 (in the illustrated embodiment 100 kilo-ohms). Any change in the position of switch 116 by one voltage step will therefore result in a potential change in the output 112 of the summation amplifier of only 0.1 volt. The combination of the two ten-position switches 114 and 116 therefore covers a two digit potential range from 00 to 99. In an alternative arrangement likewise shown in the drawing four keys 118 to 121 are provided which tap the potentials 4, 3, 2, 1 in descending order and likewise apply these to the summation amplifier 110 through resistors 122 to 125 and a wire 135. Since the values of the several resistors 122 to 125 are again ten times the value of the feedback resistor 111 the depression of the keys 118 to 121 produces potential increments in the output 112 of the summation amplifier of 0.4, 0.3, 0.2 and 0.1 volt.

The connections of the entire decimal switch combination 114 and 116 can now be changed over simply by substituting for the permanent connection 139 between the two points 136 and 137 the contacts of a change-over switch 138. Instead of 136 and 137 being connected by 139, point 136 is connected to 140 and 137 to 141. The decimal switches 114, 116 will then be operative only when the switch 138 is closed. A different arrangement is indicated in the case of the keys. In this instance the permanent connections 135 are replaced by an inverting amplifier 132 which is connected via terminals 133 and 134. The potentials which then appear in the output 112 of the summation amplifier 110 when the keys 118 to 121 are operated will therefore be positive instead of negative. The entire exposure parameter input unit 32 may now be composed of elements such as those that have been described, a summation amplifier analogous to the amplifier 110 in FIG. 10 being associated with each channel for exposure parameter signals B$a$, B$b$, B$c$ and B$d$ (FIGS. 2 and 8). The basic settings are conveniently established by preset decimal switch units, whereas an adjustment for film type can be made by selectably operable decimal switches corresponding to the switch 138 in FIG. 10. Corrections are conveniently applied by a keyboard as indicated in FIG. 10 which has the very useful property that the keyed values can be accumulated inasmuch as the potentials corresponding to the operated keys are algebraically additive. Keys supplying potentials of 0.1, 0.2, 0.3, 0.4 volt are therefore capable of covering the range from 0 to 1 volt. Since all the tapped potentials are derived from one potential divider an algebraic transfer of selected values between different categories of exposure data is always assured. The digital selection also ensures that the results are always reproducible.

Logarithmic amplifiers

Figure 11A:
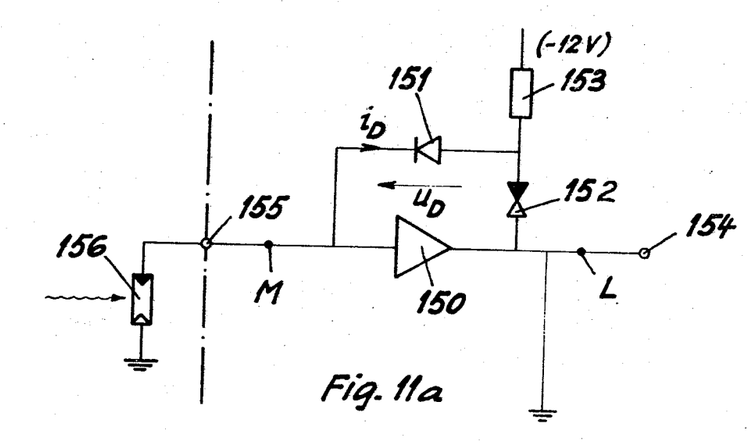
FIG. 11a shows the circuit diagram of a preferred embodiment of a logarithmic amplifier associated with a photovoltaic cell.
Figure 11B:
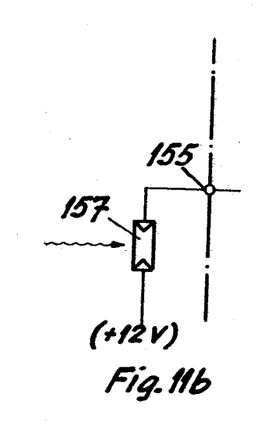
FIG. 11b shows a modification of the inupt of the logarithmic amplifier of FIG. 11a for use with a photoresistive cell.
Figure 11C:
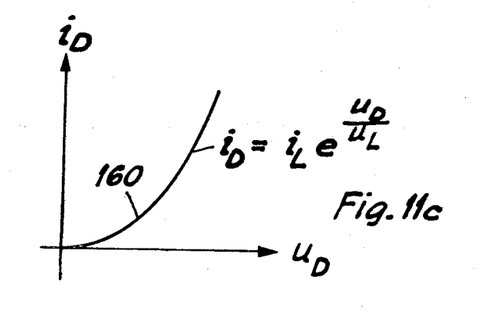
Figure 11D:
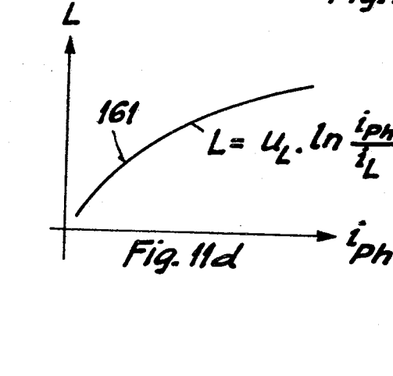
FIG. 11d is a graph of the voltage appearing in the output of the logarithmic amplifier in FIG. 11a as a function of the current through the photoresistive cell in FIG. 11b.

The logarithmic amplifiers 33$a$, 33$b$, 33$c$ in FIG. 2 may be constructed as illustrated in FIG. 11$a$. As will be understood from this diagram the logarithmic amplifier is based on the provision of an operational amplifier 150. However, feedback is not through a resistor but through a diode 151 with a logarithmic characteristic. The characteristic curve of the diode is shown in FIG. 11$c$ and marked 160. A Zener diode 152 and a resistor 153 merely serve to produce a potential shift in the output 154. When a current enters at 155 a voltage will appear in the output 154 which is proportional to the logarithm of the input current as represented by the curve 161 in the diagram in FIG. 11$d$. In FIG. 11$a$ the reference numeral 156 represents a photovoltaic cell which operates in a short circuit (the input 155 of the operating amplifier presents a very low ohmic resistance because of the negative feedback through the diode 151. In photovoltaic cells the short circuit current is known to be very precisely proportional to the incident light energy. FIG. 11$b$ shows the provision of a photoresistive cell 157 instead of a photovoltaic cell 156. The generation of a photoelectric current requires the application of a potential (indicated in the diagram as +12 volts). However, photoresistive cells have the property that their photoelectric current is nearly proportional to the incident light. The relationship is roughly as defined by the equation:

$$i_{\mathrm{ph}} = i_0 \cdot \left[\frac{\phi}{\phi_0}\right]^\alpha$$

where $i_{\mathrm{ph}}$ = photoelectric current $\phi$ = incident light (lux)

$i_0, \phi_0$ = constants $\alpha$ = a constant roughly equal to 0.8

After logarithmic amplification the potential appearing at point 154 will therefore be $$L = U_{\mathrm{L}} \cdot \ln\left[\frac{i_0}{iL} \cdot \frac{\phi}{\phi_0}\right]^\alpha = U_{\mathrm{L}}\left[C + \alpha \frac{\phi}{\phi_0}\right]$$

where

L = voltage at point 154

$i_0$, $iL$, $\phi_0$, C = constants $\alpha$ = a constant roughly equal to 0.8.

The voltage at point 154 therefore differs only by a constant factor $\alpha$ from the voltage which would arise if the photosensitive element had a precisely linear response. This factor can naturally be very easily corrected by the resistors 99$a$, 99$b$, 99$c$ in FIG. 8. The described control therefore presents no difficulties if photoresistive cells are used, despite their non-linearity, and advantage can therefore be taken of the incidental considerable advantages of photo-resistive cells (for instance their high sensitivity).

Exponential timing unit

In FIG. 4$a$ the function of the exponential timing unit 34 has already been defined. Several circuit arrangements satisfy the requirements that have been described. A particularly useful circuit arrangement is diagrammatically shown in FIG. 12. Here a capacitor 172 is charged by an input voltage applied to the input terminal 50 through a logarithmic diode 171. The voltage across the capacitor 172 is compared for equality with a reference voltage 183 in a comparator circuit 184. A transistor 173 is connected in parallel to the capacitor 172, the collector being connected to the input 174 of the comparator circuit 170 and the emitter is earthed at 175. The base of the transistor 173 is connected to the tap of a potential divider comprising the following components in series: Voltage source 176, resistor 177 and resistor 178. Whereas the negative pole of the voltage source 176 is earthed through 175, the resistor 178 is connected to the output 179 of a flip-flop 180. The voltage of the source 176 and the potential in the output 179 of the flip-flop are so matched that in rest position the transistor 172 is fully conductive and thus by-passes the capacitor 172.

Figure 12:
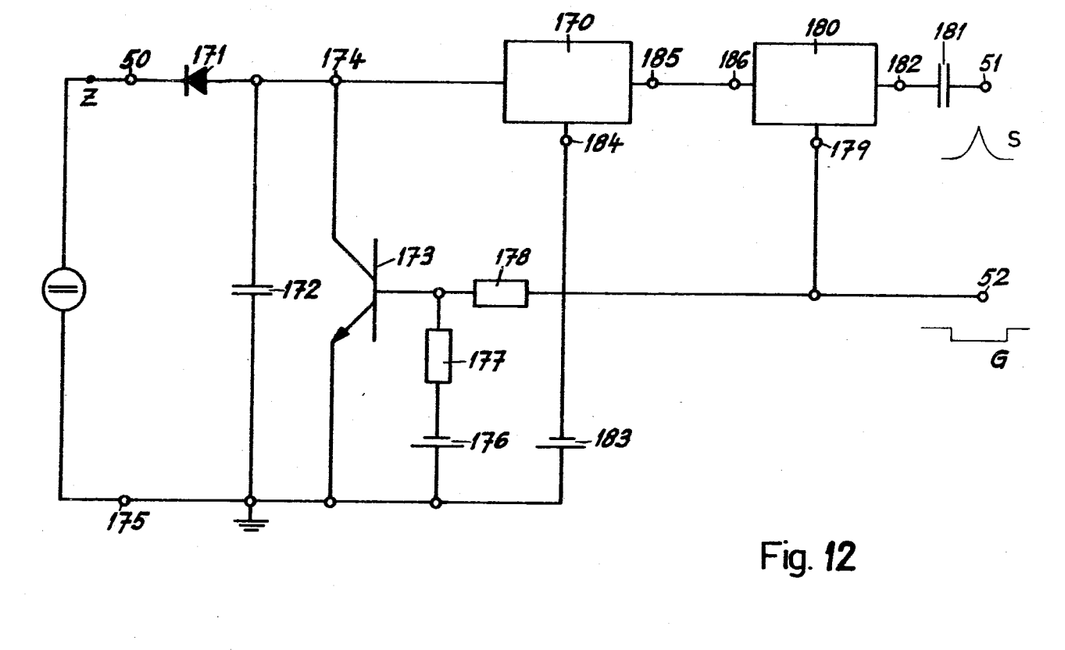
FIG. 12 shows the circuit diagram of a preferred embodiment of an exponential timing unit.

Hence, if a (positive) potential pulse S is applied via a terminal 51 and a capacitor 181 to the first input 182 of the flip-flop 180 this will change state and the potential in the output 179 of the flip-flop will change from positive to negative. The leading flank of a negative pulse G will therefore appear in the flip-flop output 179 which is also the output of the timing unit. At the same time the potential divider, viz. source 176, resistor 177 and resistor 178, has the effect of making the potential at the base of the transistor 173 sufficiently negative for the transistor to block. Consequently the capacitor will begin to be charged. When the capacitor voltage $u_\mathrm{C}$ equals the reference voltage $U'_\mathrm{C}$ of the reference source 183 the potentials at the two inputs 174 and 184 of the comparator 170 will be equal. A pulse will therefore appear in the output 185 of the comparator and this will be applied to the second input 186 of the flip-flop 180 which returns the flip-flop to its normal state. The potential in the output 179 will change back from negative to positive, thereby forming the trailing flank of the previously generated pulse. The duration of this pulse will be proportional to the logarithm of the injected control voltage Z, according to the following equation:

$$t = \tau . e^{-\frac{Z}{U_L}}$$

where

Z=magnitude of the signal at the input 50
t=duration of pulse
$\tau$, $U_L$=constants inherent in circuit and materials.

This corresponds to the desired characteristic, as assumed in FIG. 4c. If the non-linear characteristic of the diode is the same as that in the logarithmic amplifier according to FIG. 11 the constants $U_L$ are identical, so that in an arrangement in which a logarthmic amplifier according to FIG. 11 is serially associated with a logarithmic timing unit according to FIG. 12 (i.e. voltage Z in FIG. 12 being the voltage L in FIG. 11) the duration of the pulse will be as follows:

$$t = \tau . e^{-\ln\frac{i_{ph}}{i_L}} = \tau . \frac{i_L}{i_{ph}}$$

where t=duration of pulse
$i_{ph}$=photo-current
$\tau$, $i_L$=constants.

The product of "time×light" or "time×photo-current" will thus be represented by $$t \cdot i_{ph} = \tau \cdot i_L = \text{constant}$$

as required by the above-mentioned "grey equivalence."

We claim:

1. An exposure control system for a photographic multi-colour printing apparatus, comprising a white light source, selectable colour filters to control the colour of exposure, an exposure time unit controllable in dependence upon exposure parameters to provide signals each indicative of the exposure time of each of said colour filters, an input unit coupled to said exposure time unit and having circuits selectable for each colour filter in accordance with said exposure parameters to provide signals from which said exposure time indicative signals are generated, light intensity responsive means comprising a plurality of photoelectric devices each coupled via a logarithmic amplifier to said exposure time unit for responding to the intensity of the light passed by a negative or transparency in said printing apparatus to provide at least one signal indicative of the light intensity, said exposure time unit comprising means for combining said light intensity signals with the signals from said input unit so as to modify the exposure time indicative signals in accordance with the light received by said photoelectric devices, and an interchangeable exposure type unit associated with a particular type of exposure such as additive and/or subtractive and controllable by said exposure time indicative signal to produce pulses for effecting, related to the type of exposure, selection of said colour filters and the time for which they are selected, and timing units coupled between said exposure time unit and said exposure type unit, each said timing unit being arranged to receive a respective exposure time indicative signal and to develop therefrom and apply to said exposure type unit a timing pulse the duration of which is an exponential function of the magnitude of the exposure time indicative signal.

2. An exposure control system as defined in claim 1 wherein each logarithmic amplifier transfers an input current M in an output voltage $$L = u_L \ln \frac{M}{i_L}$$

where $u_L$ and $i_L$ are constants of the logarithmic amplifier and wherein each timing unit operates according to the exponential law $$t = \tau . e^{-\frac{Z}{u_L}}$$

where $t$ is the duration of the developed timing pulse, Z is the magnitude of the received exposure time indicative signal, and $\tau$ and $u_L$ are constants of the timing unit.

3. An exposure control system as defined in claim 1, characterized in that each timing unit comprises an input for receiving a trigger pulse to initiate the generation of a timing pulse, each trigger input being connected to said exposure type unit to receive trigger pulses therefrom.

4. An exposure control system as defined in claim 1, characterized in that the exposure type unit is designed for subtractive type exposures and includes means for generating signals to correct for the parasite absorption of the colour filters to be controlled, these latter means being coupled to said combining means in the exposure time unit so that said exposure time indicative signals are corrected for parasitic absorption.

5. An exposure control system as defined in claim 1, characterized in that each combining means comprises a summation amplifier.

6. An exposure control system as defined in claim 5, characterized in that said input unit comprises means coupled through a respective first potentiometer to the input of each summation amplifier to apply a common signal to the potentiometers for controlling the luminance of prints, and in that the input side of each summation amplifier is connected through an inverting amplifier and respective second potentiometers to the input side of each other summation amplifier, the second potentiometers being adjustable to prevent the luminance of the image being affected by variations in the signals generated in said input unit.

7. An exposure control system as defined in claim 1, comprising a respective potentiometer coupled to each combining means to control the value of the light intensity signal applied thereto.

8. An exposure control system as defined in claim 7 characterized in that said light intensity responsive means comprises a single photoelectric device and each of said potentiometers is connected to receive the signal derived from said single device.

9. An exposure control system as defined in claim 1, characterized in that the selectable circuits of said input unit are adapted for several categories of exposure parameters to be separately and independently fed into the exposure parameter input unit, and that these parameters are transferable from one into another category without being quantitatively changed.

10. An exposure control system as defined in claim 9, characterized in that for feeding at least one category of parameters said selectable circuits include two ten-position switches for each colour filter, means for deriving ten equally stepped constant potentials to which the ten fixed contacts of each of said switches are respectively connected; a summation amplifier, having a feedback resistor, and to the input of which the movable contacts of said switches are connected through respective resistors, the value of said resistors being in the ratio of 1:10.

11. An exposure control system as defined in claim 10, characterized in that said input unit comprises a plurality of key switches connected to at least the four lowest of the stepped constant potentials; respective resistors connected between said key switches and the input of said summation amplifier, and each having a resistance ten times the resistance of the feedback resistor of the summation amplifier.

12. An exposure control system as defined in claim 10, characterized in that said means from which the ten constant potentials are derived comprises a common potential divider having a plurality of stepped taps.

13. An exposure control system as defined in claim 11, further comprising inverting amplifiers and means to selectively insert said inverting amplifiers between the resistors connected to said key switches and the input of said summation amplifier.

14. An exposure control system as defined in claim 1, characterized in that each logarithmic amplifier comprises an operational amplifier with a feebdack loop including a diode which has a logarithmic characteristic.

15. An exposure control system as defined in claim 1, characterized in that each exponential timing unit comprises a capacitor in parallel with a transistor; a comparator device which has two inputs, a first of which is connected to the capacitor; a voltage source to which the second comparator input is connected, a diode coupled between said capacitor and said exposure time unit to transmit the associated exposure time indicative signal to the capacitor; the emitter and collector of the transistor being connected in parallel with the capacitor; a flip-flop having a first input coupled to said exposure type unit to receive trigger pulses therefrom, and an output; a resistor connected between said output of the flip-flop and the base of said transistor; the flip-flop having a second input coupled to said comparator device to receive output signals therefrom resulting from comparison of the signals at the two inputs thereof.

16. An exposure control system as defined in claim 1, characterized in that the exposure type unit comprises three inputs and three outputs; six diodes coupling a different two outputs to each input with like polarity to cause a timing pulse on one input to be transmitted to two outputs for controlling additive exposure type colour filters.

17. An exposure control system as defined in claim 1, characterized in that the exposure type unit comprises three inputs and three outputs directly and respectively connected together so that a timing pulse at one input is transmitted to only one output for controlling subtractive type colour filters.

18. An exposure control system as defined in claim 4, characterized in that the exposure type unit comprises three inputs and three outputs directly and respectively connected together so that a timing pulse at one input is transmitted to only one output for controlling subtractive type colour filters; and in that said means for generating said parasitic absorption correction signals comprises three further outputs; six potentiometers coupling said three further outputs to said three further inputs, each further output being coupled to a different pair of inputs through respective potentiometers.

References Cited

UNITED STATES PATENTS

| | | | |
|---|---|---|---|
| 3,229,574 | 1/1966 | Neale et al. | 355—38 X |
| 3,293,033 | 12/1966 | Maddock et al. | 355—38 X |

NORTON ANSHER, Primary Examiner

RICHARD A. WINTERCORN, Assistant Examiner

U.S. Cl. X.R.

350—315; 355—41, 68; 356—175